United States Patent
Holierhoek et al.

(10) Patent No.: US 7,751,438 B2
(45) Date of Patent: Jul. 6, 2010

(54) COMMUNICATION SYSTEM BANDWIDTH RESERVATION MANAGEMENT

(75) Inventors: Hubert Holierhoek, Kinburn (CA);
Hamdy Mahmoud Farid, Kanata (CA);
Michael Best, Ottawa (CA)

(73) Assignee: Alcatel Lucent, Paris (FR)

( * ) Notice: Subject to any disclaimer, the term of this patent is extended or adjusted under 35 U.S.C. 154(b) by 781 days.

(21) Appl. No.: 11/535,530

(22) Filed: Sep. 27, 2006

(65) Prior Publication Data
US 2008/0075116 A1    Mar. 27, 2008

(51) Int. Cl.
*H04J 3/14* (2006.01)
*H04J 3/16* (2006.01)

(52) U.S. Cl. .................. 370/468; 370/477; 709/228; 709/233

(58) Field of Classification Search ................. 370/252, 370/468, 477; 709/223, 224, 226, 228, 232, 709/233
See application file for complete search history.

(56) References Cited

U.S. PATENT DOCUMENTS

| | | | | |
|---|---|---|---|---|
| 5,912,894 A | * | 6/1999 | Duault et al. | 370/433 |
| 6,011,776 A | * | 1/2000 | Berthaud et al. | 370/232 |
| 2004/0143663 A1 | * | 7/2004 | Leedom et al. | 709/226 |
| 2005/0138175 A1 | * | 6/2005 | Kumar et al. | 709/226 |
| 2008/0101460 A1 | * | 5/2008 | Rodriguez | 375/240.01 |

* cited by examiner

*Primary Examiner*—Chi H Pham
*Assistant Examiner*—Ahmed Elallam
(74) *Attorney, Agent, or Firm*—Smart & Biggar (57) ABSTRACT

Communication system bandwidth reservation management techniques are disclosed. If actual usage of a reserved amount of bandwidth in a communication system reflects a reduced usage state, a determination is made as to whether the reserved amount of bandwidth is to be adjusted. A portion of the bandwidth that has been reserved for a Video-on-Demand session, for example, may be released when playback of a video is paused. A time-based series of reduced usage states may be defined such that reserved bandwidth is gradually released if the reserved bandwidth is not actually used for a period of time. Embodiments of the invention may be implemented in various forms of apparatus, methods, data structures, and Graphical User Interfaces (GUIs).

17 Claims, 4 Drawing Sheets

COMMUNICATION SYSTEM BANDWIDTH RESERVATION MANAGEMENT

FIELD OF THE INVENTION

This invention relates generally to communications and, in particular, to management of reserved bandwidth in a communication system.

BACKGROUND

Session admission for services such as Video-on-Demand (VoD) in an Internet Protocol (IP) communication network may involve reserving an amount of bandwidth that is required to ensure high quality transmission of purchased video content. The bandwidth is normally reserved for communications through the network between an end user system and a VoD server. The bandwidth reservation is made to ensure that the quality of the video signal at the end user's system, typically a set-top box, is consistently high throughout playback of the video.

Once all bandwidth in a portion of the network has been reserved for in-progress video sessions, subsequent requests for bandwidth reservation, such as new VoD session requests, are denied if they would have to traverse that portion of the network.

A user may pause a purchased video at any time, and for any length of time, during which no video data is actually transmitted and the reserved bandwidth is thus not used. However, the bandwidth remains reserved for a paused video session and may cause other video purchase requests to be denied due to a perceived lack of bandwidth. Bandwidth that is reserved for a paused session is, in fact, not actually being used.

Simply releasing all of the bandwidth reserved for a video session when it is first paused might not be feasible. If all of the bandwidth were to be released, then it might not be possible to service a request to resume playing the video. For example, the required bandwidth may have been allocated to other VoD sessions during the pause time.

When video rental periods are factored in, the problem of unused but reserved bandwidth can become even more significant. A video may have a rental period of several days for instance, during which time a purchaser can watch the video as often as desired. Reserving bandwidth for the entire rental period is excessive because the purchaser will likely only watch the video for a small portion of the overall rental period.

Thus, there remains a need for improved techniques for managing reserved bandwidth.

SUMMARY OF THE INVENTION

According to an aspect of the invention, there is provided an apparatus that includes a usage monitor operable to determine whether actual usage of a reserved amount of bandwidth in a communication system reflects a reduced usage state, and a reservation manager operatively coupled to the usage monitor and operable to determine whether the reserved amount of bandwidth is to be adjusted where the actual usage reflects the reduced usage state, and to adjust the reserved amount of bandwidth where the reserved amount of bandwidth is to be adjusted.

The apparatus may also include an interface operatively coupled to the usage monitor. In this case, the usage monitor may be operable to receive through the interface an indication of a mode of communications for which the reserved amount of bandwidth was reserved, and to determine whether actual usage of the reserved amount of bandwidth reflects a reduced usage state based on the indication.

If the reduced usage state is one of a plurality of reduced usage states, the usage monitor may be operable to determine whether actual usage of the reserved amount of bandwidth reflects a reduced usage state by determining whether actual usage of the reserved amount of bandwidth reflects any state of the plurality of reduced usage states. The reservation manager may then determine whether the reserved amount of bandwidth is to be adjusted based on respective parameters that are associated with the plurality of reduced usage states and are indicative of target amounts of bandwidth in accordance with which the reserved amount of bandwidth is to be adjusted for the plurality of reduced usage states.

The respective target amounts of bandwidth may include different target amounts of bandwidth associated with different states of the plurality of reduced usage states.

In some embodiments, the apparatus also includes a user interface operatively coupled to at least one of the usage monitor and the reservation manager. Such a user interface may enable configuration of the plurality of reduced usage states, configuration of the respective parameters, or configuration of both the plurality of reduced usage states and the respective parameters. The user interface may be operable to present a Graphical User Interface (GUI) to a user, for example.

The plurality of reduced usage states may be a time-based series of reduced usage states.

Where the reserved amount of bandwidth is an amount of bandwidth reserved for communications between end user equipment and a server system, the reduced usage state may include a user-initiated suspension of the communications.

The reservation manager may be further operable to enable amounts of bandwidth to be reserved. In this case, the usage monitor may be further operable to determine whether actual usage of an adjusted amount of reserved bandwidth is to return to a normal usage state from the reduced usage state, and the reservation manager may be operable to determine whether additional bandwidth is available in the communication system, and to increase the adjusted amount of reserved bandwidth where actual usage of the adjusted amount of reserved bandwidth is to return to the normal usage state and additional bandwidth is available.

Such an apparatus may be implemented, for example, in a network element that is operable to enable communications in a communication network, or in a communication network admission control system that is operable to control admission of communication sessions into a communication network.

A method is also provided, and includes determining whether actual usage of a reserved amount of bandwidth in a communication system reflects a reduced usage state, determining whether the reserved amount of bandwidth is to be adjusted where the actual usage reflects the reduced usage state, and adjusting the reserved amount of bandwidth where the reserved amount of bandwidth is to be adjusted.

The operation of determining whether actual usage of the reserved amount of bandwidth reflects a reduced usage state may involve receiving an indication of a mode of communications for which the reserved amount of bandwidth was reserved, and determining whether actual usage of the reserved amount of bandwidth reflects a reduced usage state based on the indication.

Where the reduced usage state is one of a plurality of reduced usage states, the operation of determining whether actual usage of the reserved amount of bandwidth reflects a reduced usage state may involve determining whether actual usage of the reserved amount of bandwidth reflects any state of the plurality of reduced usage states. The operation of determining whether the reserved amount of bandwidth is to be adjusted may then involve determining respective parameters that are associated with the plurality of reduced usage states and are indicative of target amounts of bandwidth in accordance with which the reserved amount of bandwidth is to be adjusted for the plurality of reduced usage states.

As noted above, the plurality of reduced usage states may be a time-based series of reduced usage states.

The reserved amount of bandwidth may be an amount of bandwidth reserved for communications between end user equipment and a server system. The operation of determining whether actual usage of the reserved amount of bandwidth reflects a reduced usage state may then involve determining whether a suspension of the communications has been initiated at the end user equipment.

In some embodiments, the method also includes determining whether actual usage of an adjusted amount of reserved bandwidth is to return to a normal usage state from the reduced usage state, determining whether additional bandwidth is available in the communication system where actual usage of the adjusted amount of reserved bandwidth is to return to the normal usage state, and increasing the adjusted amount of reserved bandwidth where additional bandwidth is available.

Such a method may be embodied, for example, in instructions stored on a machine-readable medium.

According to another aspect of the invention, a machine-readable medium stores a data structure that includes an indication of a state of reduced usage of a reserved amount of bandwidth in a communication system, and an indication of a target amount of bandwidth in accordance with which a reserved amount of bandwidth is to be adjusted where actual usage of the reserved amount of bandwidth reflects the reduced usage state.

A GUI is also provided, and includes a first graphical element representing a state of reduced usage of a reserved amount of bandwidth in a communication system, and a second graphical element representing a target amount of bandwidth in accordance with which a reserved amount of bandwidth is to be adjusted where actual usage of the reserved amount of bandwidth reflects the reduced usage state.

The first graphical element may enable configuration of the reduced usage state.

In some embodiments, the second graphical element enables configuration of the target amount of bandwidth.

Other aspects and features of embodiments of the present invention will become apparent to those ordinarily skilled in the art upon review of the following description.

BRIEF DESCRIPTION OF THE DRAWINGS

Examples of embodiments of the invention will now be described in greater detail with reference to the accompanying drawings.

DETAILED DESCRIPTION OF PREFERRED EMBODIMENTS

Figure 1:
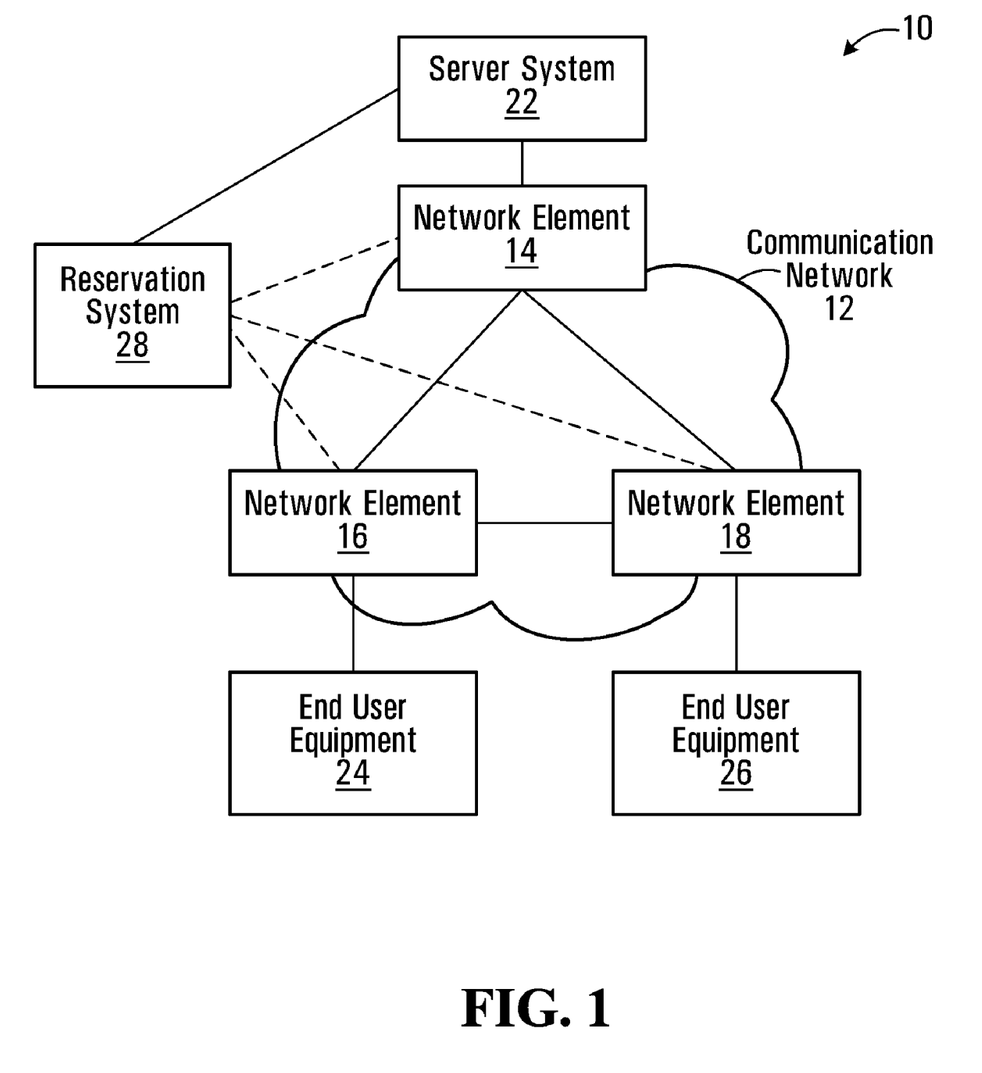
FIG. 1 is a block diagram of a communication system.

FIG. 1 is a block diagram of a communication system in conjunction with which embodiments of the invention may be implemented. The communication system 10 includes a communication network 12, a server system 22, end user equipment 24, 26, and a reservation system 28. The communication network 12 includes network elements 14, 16, 18.

It should be appreciated that the system 10 of FIG. 1, as well as the contents of the other drawings, are intended solely for illustrative purposes, and that the present invention is in no way limited to the particular example embodiments explicitly shown in the drawings and described herein. For example, a communication system may include different numbers of networks, network elements, server systems, end user equipment installations, and/or reservation systems than shown in FIG. 1. Only one or more representative examples of each type of component have been shown in FIG. 1 to avoid overly complicating the drawing.

The communication network 12 enables the server system 22 to communicate with the end user equipment 24, 26. Switches and routers are illustrative of the types of communication equipment represented by the network elements 14, 16, 18. These network elements provide the server system 22 and the end user equipment 24, 26 with access to the communication network 12 and thus have been shown at the edge of the communication network 12 in FIG. 1 for illustrative purposes.

The communication network 12, in addition to the border or edge network elements 14, 16, 18, may also include core network elements that route communication traffic through the communication network. The communication network 12 may thus include network elements in the form of edge, core, and/or other types of communication equipment.

The end user equipment 24, 26 represents communication equipment that is configured to transmit and/or receive communication traffic, which may include any of various type(s) of information such as data files, pictures, voice, video, etc. In one embodiment, each installation of end user equipment 24, 26 includes a set-top box for streaming video from the server system 22 for display to a user. Although shown as being directly connected to the network elements 16, 18, it will be apparent that end user equipment 24, 26 may communicate with the network elements 16, 18 through other intermediate components (not shown).

A service or function such as a VoD service may be supported by the server system 22. Through an interface to the communication network 12, the server system 22 may receive requests for service from the end user equipment 24, 26 and also respond to those requests. Considering the example of a VoD service, the server system 22 may include a large-capacity data store for storing video information and a service component, implemented using software and a processor for instance, for handling video purchase requests.

Many different types of server, end user, access, and network communication equipment, as well as the operation thereof, will be apparent to those skilled in the art. In general, communication traffic originating with the server system 22, the end user equipment 24, 26, and possibly other sources of communication traffic, for transfer to destinations through the communication network 12, is received by a network element 14, 16, 18, translated between different protocols or formats if necessary, and routed through the communication network.

Any of various types of communication links and/or protocols may be used to implement access communication links used by the network elements 14, 16, 18 to exchange communication traffic with the server system 22 and the end user equipment 24, 26 and network communication links used for transfer of communication traffic in the communication network 12. It should be appreciated that embodiments of the invention are not limited to any particular types of communication links, transfer mechanisms, or protocols.

As noted above, it may be desirable to reserve communication signal transfer capacity, generally referred to herein as bandwidth, in the communication system 10 for certain types of communications. Video quality can be assured for a VoD session, for instance, by reserving bandwidth for transfer of video signals between a VoD server and a user's set-top box. The reservation system 28 enables such reservations to be made.

The reservation system 28 may thus include one or more interfaces to the communication network 12, and possibly to each network element 14, 16, 18 as shown, so that it may determine the amount of bandwidth available for reservation. A record of available and/or reserved bandwidth might also be maintained by the reservation system 28 in a data store. A communication system interface, or a separate dedicated interface, might also be provided to enable the reservation system 28 to receive requests for bandwidth reservations from the server system 22.

Many schemes are available for reserving communication system bandwidth, which is also often referred to as bandwidth allocation. Although the present invention relates to management of reserved bandwidth, embodiments of the invention are not limited to any particular bandwidth reservation scheme. Based on the disclosure provided herein, a person skilled in the art will be enabled to implement techniques according to embodiments of the invention in conjunction with any of various bandwidth reservation schemes.

In conventional bandwidth reservation schemes, bandwidth reserved for one user or entity is not available for other users or entities, regardless of whether the reserved bandwidth is actually being used while it remains reserved. Embodiments of the invention, as described in further detail herein, may be used to allow communication system or network operators to reclaim or "borrow back" a portion of reserved bandwidth when current usage of that reserved bandwidth is at a reduced level. Reclaimed bandwidth may be used for new video sessions between a VoD server system and an end user system for instance. According to one possible mechanism, a network operator could be given control over a time-based gradient of percentages to be applied to a video session's reserved bandwidth while that video session is paused. This bandwidth may then be used for the admission of new video sessions.

Figure 2:
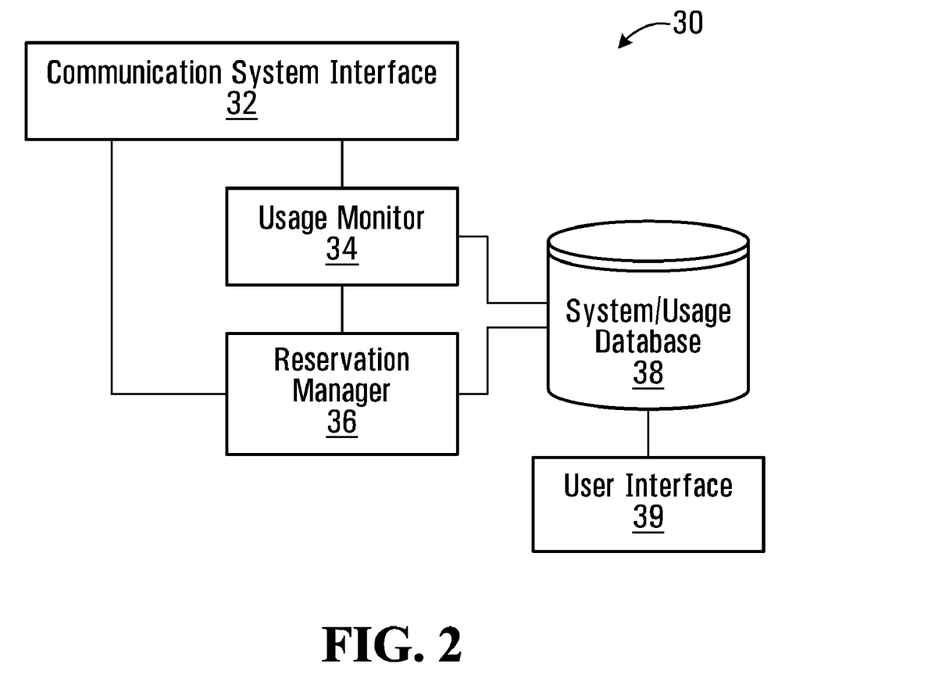
FIG. 2 is a block diagram of a bandwidth reservation management apparatus.

FIG. 2 is a block diagram of a bandwidth reservation management apparatus that implements an embodiment of the present invention. The apparatus 30 includes a communication system interface 32, a usage monitor 34 and a reservation manager 36 operatively coupled to each other and to the communication system interface, a system/usage database 38 operatively coupled to the usage monitor and to the reservation manager, and a user interface 39 operatively coupled to the system/user database.

The particular apparatus shown in FIG. 2 is intended solely for the purposes of illustration, and not to limit the invention. For example, communication equipment in which or in conjunction with which an embodiment of the invention is implemented may include more or fewer components than specifically shown. The apparatus 30 might be implemented in a network element that is operable to enable communications in a communication network, or in a communication network admission control system that controls admission of communication sessions into a communication network. These types of communication equipment would generally include additional components that have not been shown in FIG. 2.

The division of function represented in FIG. 2 is also illustrative of an embodiment of the invention. The usage monitor 34 and the reservation manager 36 could possibly be integrated into one physical device. References to these components should thus be interpreted accordingly. The number and types of interfaces provided may similarly vary between implementations. The usage monitor 34 and the reservation manager 36 might interact with network elements and a server system, respectively, through different types of interfaces, and the user interface 39 might not be provided if bandwidth reservation management settings are predetermined and not configurable by a user, for instance.

Thus, embodiments of the invention may be implemented using further, fewer, or different components than explicitly shown, with similar or different interconnections.

The types of connections through which the components of FIG. 2 are operatively coupled may, to at least some extent, be implementation-dependent. Communication equipment components often use various types of physical connectors and wired connections such as midplane and backplane conductors, although the present invention is in no way limited to wired connections. In the case of cooperating software functions, for example, an operative coupling may be through variables or registers, and thus be more so a logical coupling than a direct physical coupling. The user interface 39 may be indirectly coupled to the usage monitor 34 and/or to the reservation manager 36 in such a manner, through the system/usage database 38.

The communication system interface 32 includes one or more physical interfaces, and possibly interfaces of multiple different types, that enable the apparatus 30 to communicate with other components of a communication system. As described in further detail below, the usage monitor 34 and the reservation manager 36 may interact with other communication system components to perform such functions as monitoring current usage of reserved communication system bandwidth, tracking and/or reserving available bandwidth, etc. Although a single communication system interface 32 is shown in FIG. 2, the usage monitor 34 and the reservation manager 36 need not necessarily be connected to the same interface or interfaces. The number and types of interfaces, and also their connection(s) to the usage monitor 34 and the reservation manager 36 may vary depending on the communication system components in conjunction with which the apparatus 30 is implemented. Those skilled in the art will be familiar with many such interfaces and their operation.

One or more memory devices may be used to store the system/usage database 38. Solid state memory devices are common in communication equipment, although other types of memory devices, including devices for use with movable or even removable storage media, may also or instead be used.

Figure 4:
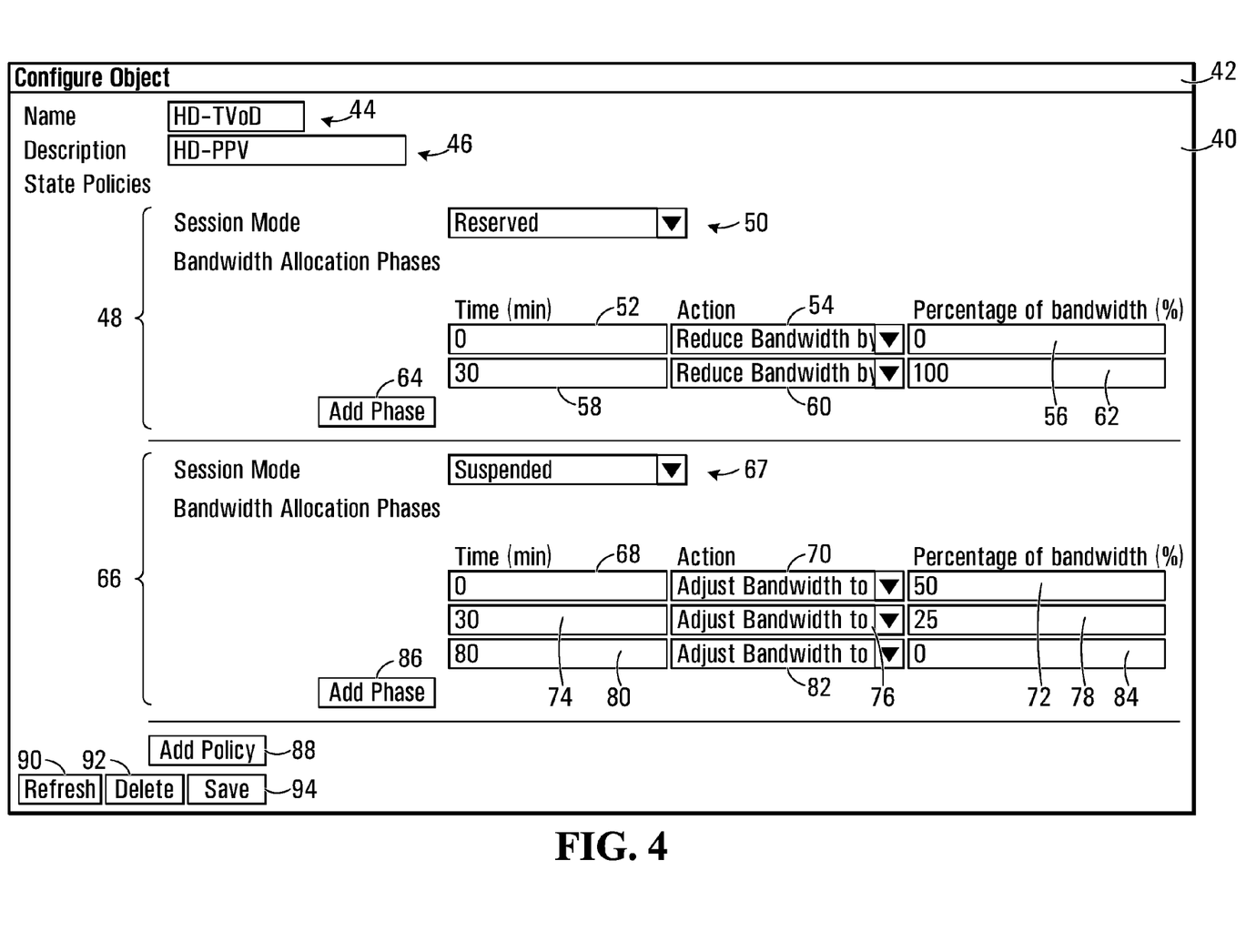
FIG. 4 is a block diagram of an example bandwidth reservation management Graphical User Interface (GUI).

Like the communication system interface 32, the user interface 39 may include one or more physical devices. The user interface 39, however, enables interactions between a user and the apparatus 30. Through a display device, for instance, a GUI could be presented to a user. An example of a screen that may be provided as part of such a GUI is shown in FIG. 4 and described below. A Command Line Interface (CLI) is another example of a user interface 39. Other implementations of the user interface 39 may be or become apparent to those skilled in the art.

The usage monitor 34 and the reservation manager 36 detect reduced levels of usage of reserved bandwidth and may adjust the amount of reserved bandwidth so as to reclaim at least a portion of currently unused but reserved bandwidth. These components may be implemented using hardware, firmware, software for execution by one or more processing elements, or some combination thereof. Any or all of devices such as microprocessors, microcontrollers, programmable logic devices (PLDs), Field Programmable Gate Arrays (FPGAs), Application Specific Integrated Circuits (ASICs), and other types of "intelligent" integrated circuits may be suitable for this purpose.

Given the many possible options for implementing the usage monitor 34 and the reservation manager 36, these components are described herein primarily in terms of their functions. Based on the functional descriptions, a person skilled in the art will be enabled to implement bandwidth reservation management techniques according to embodiments of the invention in any of various ways.

In operation, the usage monitor 34 determines whether the actual usage of a reserved amount of bandwidth in a communication system currently reflects a reduced usage state. This determination may involve "passive" or "active" monitoring of communications in a communication system by the usage monitor 34.

According to one embodiment of passive monitoring, the communication system interface 32 includes an interface that enables the usage monitor 34 to receive an indication of a mode of communications over a communication link or session for which an amount of bandwidth was reserved. For example, a VoD server that has reserved an amount of bandwidth for transfer of a purchased video to a user system might provide to the usage monitor 34 an indication that the user has paused the video. The usage monitor 34 then determines whether actual usage of the reserved amount of bandwidth reflects a reduced usage state based on the received indication. A video playback pause is one example of a user-initiated suspension of communications for which an amount of bandwidth might have been reserved.

The usage monitor 34 may also or instead perform more active monitoring of communications in a communication system. In this case, the communication system interface 32 may include one or more interfaces that are operatively coupled to the usage monitor 34 and to communication equipment such as network elements through which communication traffic is transferred. The usage monitor 34 is then able to detect actual bandwidth usage, and to determine whether the actual usage is at a normal level or a reduced level.

A reduced usage state may be defined in data that is stored in the system/usage database 38. The reduced usage state may be specified, for example, in terms of the mode of communications over a communication link or session, "paused" in the above VoD example, actual bandwidth usage, and/or possibly other parameters. As described in further detail below, reduced usage state definitions may be configurable by a user through the user interface 39.

If the actual bandwidth usage reflects a reduced usage state, as determined by the usage monitor 34, the reservation manager 36 determines whether the reserved amount of bandwidth is to be adjusted, and adjusts the reserved amount of bandwidth accordingly. Bandwidth adjustments may be made by the reservation manager 36 by releasing a portion of the reserved bandwidth, for example. Where records of bandwidth reservations are stored in the system/usage database 38, the reservation manager 36 may update the record for a bandwidth reservation to which an adjustment has been made. This maintains an accurate account of bandwidth that remains reserved. From reserved bandwidth information, the amount of bandwidth that is available in a communication system can be calculated.

Reserved bandwidth might not necessarily be adjusted for every reduced usage state, or every time a reduced usage state is detected by the usage monitor 34, as discussed in further detail below. An adjustment determination by the reservation manager 36 may be based on bandwidth adjustment parameters stored in the system/usage database 38, for instance.

The reservation manager 36 may also handle bandwidth reservations, and not only adjustment of bandwidth reservations. That is, bandwidth may also be reserved through the reservation manager 36 in some embodiments. In this case, the usage monitor 34 might be operable to determine whether actual usage of an adjusted amount of reserved bandwidth is to return to a normal usage state from the reduced usage state, when a VoD user resumes playback after a pause for instance. The reservation manager 36, by accessing a record of reserved and/or available bandwidth in the system/usage database 38 for instance, determines whether additional bandwidth is available, and if so, can increase the amount of reserved bandwidth.

If additional bandwidth is not available, then resumption of communications could be delayed, or subsequent communications may be otherwise affected by the now reduced amount of reserved bandwidth. However, in general, it may be easier to recover a portion of reclaimed bandwidth than to reserve an entire new amount of bandwidth. Supposing that a VoD user resumes playback of a video after 25% of initially reserved bandwidth has been reclaimed during a pause period for instance, a communication system may have sufficient additional bandwidth to grant a request to reserve 25% of initial bandwidth when a request for 100% of that bandwidth would fail.

It is expected that bandwidth reservation and bandwidth reservation management will be implemented in the same apparatus in many embodiments. These functions could instead be implemented substantially independently.

In the foregoing description of FIG. 2, operation of the usage monitor 34 and the reservation manager 36 have been considered in the context of a single reduced usage state. The reduced usage state may, however, be one of multiple reduced usage states. For example, a communication network operator may decide that if a VoD session has been paused for more than 5 minutes, they will reclaim 25% of the reserved bandwidth, if more than 30 minutes, they will reclaim 50%, and if more than 2 hours, they will reclaim 90%. This type of staged bandwidth reclaiming strategy could be configured as three reduced usage states, with corresponding bandwidth parameters that are indicative of target amounts of bandwidth for the three reduced usage states.

The operator in this example is then able to take advantage of the fact that if a user has already paused the video for some length of time, on average they are likely to keep it paused for some greater length of time. The pause time aspect effectively provides a reclaiming gradient or time-based progression of reduced usage states, which allows the operator to better take advantage of user behavior. A user that has paused playback of a video for 5 minutes is much more likely to resume in the next 5 minutes than a user that has been paused for a much longer period of time. The operator may thus define a reclaim strategy and corresponding reduced usage states and bandwidth parameters to reclaim progressively larger portions, illustratively percentages, of reserved bandwidth as the pause duration increases.

The preceding example also illustrates a reduced usage state in which no bandwidth adjustment is made. When playback is first paused, actual usage of reserved bandwidth is reduced. However, no adjustment is made unless playback remains paused for more than five minutes. These pause time parameters may be used to define different reduced usage states, including a first state in which playback has been paused for up to 5 minutes (no bandwidth reclaimed), a second state in which playback has been paused for more than 5 minutes and up to 30 minutes (25% of bandwidth reclaimed), a third state in which playback has been paused for more than 30 minutes and up to 2 hours (50% of bandwidth reclaimed), and a fourth state in which playback has been paused for more than 2 hours (90% of bandwidth reclaimed).

Figure 3:
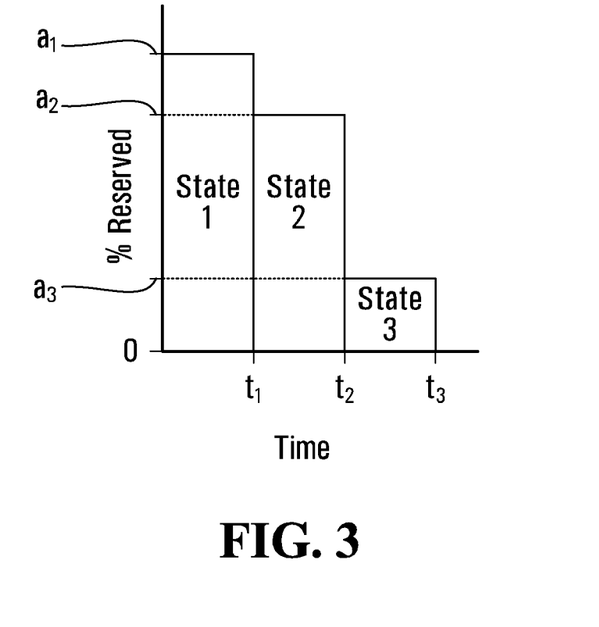
FIG. 3 is a plot representing an example of a time-based series of reduced usage states and corresponding target bandwidth amounts.

More generally, an amount of remaining reserved bandwidth becomes progressively less while the reserved bandwidth is not being used. This is illustrated in FIG. 3, which is a plot representing an example of a time-based series of reduced usage states and corresponding target bandwidth amounts. In FIG. 3, an amount $a_1$ of reserved bandwidth remains reserved in State 1, an amount $a_2$ of reserved bandwidth remains reserved in State 2, and an amount $a_3$ of reserved bandwidth remains reserved in State 3. Although not specifically labelled in FIG. 3, the remaining amount $a_3$ of previously reserved bandwidth may be reclaimed in a further reduced usage state at time $t_3$.

It should be appreciated that states 1, 2, and 3 may be delineated as different states for the purposes of bandwidth reservation management, but may be associated with the same mode of communications in a communication system. As described above, a series of reduced usage states and corresponding adjustments may be defined for different video playback pause times. In the example of FIG. 3, reserved bandwidth may be reduced to an amount $a_1$ when playback is first paused. This amount may be 100% of originally reserved bandwidth where a pause of up to a certain amount of time $t_1$ is permitted by a network operator, for instance. If video playback remains paused at time $t_1$, the amount of reserved bandwidth is reduced to $a_2$. Reserved bandwidth is further reduced at time $t_2$, and again at $t_3$, unless playback is resumed.

The usage monitor 34 may thus determine whether actual usage of a reserved amount of bandwidth reflects any of multiple reduced usage states. Where a time-based progression of reduced usage states has been configured, a timer may be used to allow the usage monitor 34 to determine the correct reduced usage state. In the case of a paused video session, for example, the usage monitor 34 may progress through a time-based series of reduced usage states until it determines that playback has been resumed. Even though a reduced usage state may be a combination of a communication session mode and the elapsed time since entering that mode, only the mode might be stored explicitly in some embodiments. The use of a timer may avoid any need to store the elapsed time as an explicit state variable. More generally, the composite parts that make up a reduced usage state might not necessarily all be stored as explicit state variables.

For each reduced usage state, the reservation manager 36 determines whether the reserved amount of bandwidth, which may be a remaining amount of reserved bandwidth if an adjustment has already been made for a preceding state, is to be adjusted. This determination may be based on one or more parameters that are associated with each reduced usage state and are indicative of target amounts of bandwidth for the reduced usage states. The percentages $a_1$, $a_2$, $a_3$ are examples of such parameters.

The differences between the reserved bandwidth amounts $a_1$, $a_2$, $a_3$ in FIG. 3 illustrate amounts by which reserved bandwidth is adjusted for each state. These adjustments are different for each state in the example of FIG. 3, but may be the same in other embodiments.

A time-based series of states and corresponding bandwidth parameters may be designed on the basis of expected and/or observed user behavior. Of course, different users may exhibit different behaviors. Not every user will remain paused for the exact same length of time, for example. However, the risks of over-subscription and/or adverse effects of bandwidth reclaiming can be reduced where average behaviors are calculated or predictable and bandwidth parameters are properly crafted. While this does not provide an absolute guarantee on availability of bandwidth upon resumption of normal usage, when video playback is resumed for instance, it allows an operator or service provider to more finely balance these risks against optimal network utilization.

FIG. 4 is a block diagram of an example bandwidth reservation management GUI, and illustrates the foregoing and other aspects of bandwidth reservation management according to embodiments of the invention. The GUI 40 could be displayed on a user interface device such as a display at a subscriber management system. A graphical user interface device might be provided as the user interface 39 in the apparatus 30 (FIG. 2) for instance.

As shown, the GUI 40 includes a title bar 42, and various graphical elements representing configurable parameters associated with an object. The object in the example shown represents a High Definition Transactional VoD (HD-TVoD) service, as indicated in the "Name" graphical element 44. The "Description" graphical element 46 indicates that HD-TVoD is an HD Pay-Per-View (HD-PPV) service.

The "State Policies" graphical elements designated generally by 48, 66 represent several reduced usage states for bandwidth allocations or reservations that are made for the HD-TVoD service. The "Session Mode" graphical elements 50, 67 represent respective modes of communications for which bandwidth has been reserved. A "Reserved" mode at 50 indicates that a subscriber has purchased an HD-PPV video but has not yet started to view the video. A "Suspended" mode at 67 indicates that video playback has been paused. The "Bandwidth Allocation Phases" define respective reduced usage states associated with the "Reserved" and "Suspended" communications modes.

In FIG. 4, separate graphical elements have been labelled for "Session Mode" and "Bandwidth Allocation Phases". However, it should be noted that references herein to reduced usage states may encompass modes of communications (i.e., the "Session Mode" 50, 67), different phases associated with the same mode of communications (i.e., the "Bandwidth Allocation Phases" under each "Session Mode" 50, 67), or both. Thus, a reduced usage state may be defined by a mode of communications, a time period during which the same mode of communications is maintained, and/or possibly other parameters.

In the example shown in FIG. 4, each reduced usage state is defined by a mode of communications and a time duration. The graphical element 52 represents a reduced usage state in which bandwidth has been reserved but actual usage of that bandwidth has not yet started. A user may have purchased but not yet started viewing a video, for example. After 30 minutes, as indicated at 58, another reduced usage state is entered. Similarly, as indicated at 68, 74, 80, a time-based progression of reduced usage states for the "Suspended" communications mode has also been defined. Other reduced usage states associated with the "Reserved" and "Suspended" communications modes may be added by clicking on or otherwise selecting the "Add Phase" buttons 64, 86.

Any actions to be taken in each reduced usage state are also represented by graphical elements in the GUI 40. In the example shown, actions are configurable via pulldown menus at 54, 60, 70, 76, 82 and via manual entries at 56, 62, 72, 78, 84. The "Action" pulldown menu may include options such as "Reduce Bandwidth by" if an amount by which reserved bandwidth is to be reduced will be entered, "Adjust Bandwidth to" if an amount to which bandwidth is to be adjusted will be entered, and/or possibly other types of actions.

The bandwidth parameters specified under "Percentage of bandwidth (%)" in FIG. 4 are indicative of target bandwidth amounts in accordance with which a reserved amount of bandwidth is to be adjusted for each of the reduced usage states. A target bandwidth amount might be an adjustment amount, specifying by how much reserved bandwidth is to be adjusted, or an adjusted amount specifying how much bandwidth is to remain reserved, for example. In the GUI 40, bandwidth parameters are percentage-based. However, these parameters could also or instead include other types of relative amounts or absolute amounts.

FIG. 4 clearly illustrates that bandwidth reservation management may be applicable to various stages of a communication session, such as a video purchase and viewing process. These stages may include the time between the purchase and the actual start of the video playback, shown in FIG. 4 as "Reserved", and the time between successive viewings within a rental period, shown in FIG. 4 as "Suspended", which could potentially span several days.

The "Add Policy" button 88 allows further reduced usage states to be defined. The "Refresh" button 90 populates the GUI 40 for the object named at 44, from a database or other store for instance. This may allow any changes that have not yet been saved to be discarded, or a current configuration that may include changes saved by another user to be viewed. A configured object may be deleted by selecting the "Delete" button 92, and configuration changes can be saved to a database, for example, by selecting the "Save" button 94.

Other embodiments of the invention may provide GUIs having different layouts, fonts, graphical elements, etc., than shown in FIG. 4. For example, "Delete Phase" and/or "Delete Policy" buttons could be provided to delete configured reduced usage states. A "Cancel" button might allow a user to exit the "Configure Object" screen without saving changes. The various graphical elements shown in FIG. 4 could possibly be shown in different screens in some embodiments. Configuration mechanisms may also be different than shown. Any of manual entry, pulldown menus, popup menus, buttons, and possibly other types of entry or selection schemes may be used to configure reduced usage states and/or corresponding bandwidth parameters.

Figure 5:
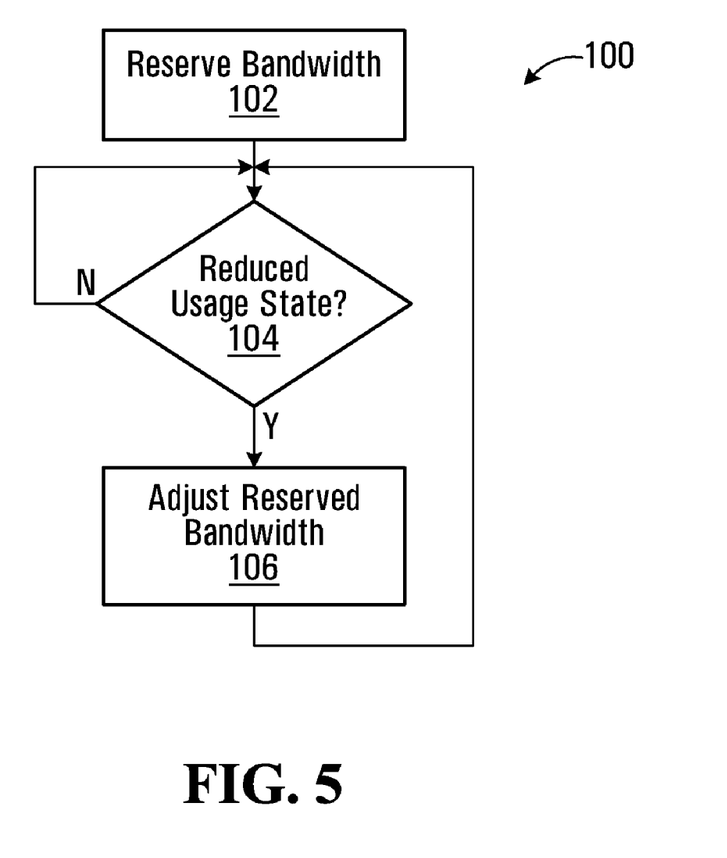
FIG. 5 is a flow diagram illustrating a bandwidth reservation management method.

The bandwidth reservation management techniques disclosed herein may also be embodied in methods. FIG. 5 is a flow diagram illustrating such a bandwidth reservation management method. The method 100 begins at 102, when a bandwidth reservation is made. At 104, a determination is made as to whether actual usage of the amount of bandwidth reserved at 102 reflects a reduced usage state. If so, the amount of reserved bandwidth is adjusted at 106.

As described in detail above, the process of adjusting the amount of reserved bandwidth at 106 may involve first determining whether the reserved amount of bandwidth is to be adjusted, and then adjusting the reserved amount of bandwidth only if an adjustment is to be made.

Other variations of the method 100 are also contemplated. For example, a bandwidth reservation management method may, but need not necessarily, handle the process of reserving bandwidth at 102. In general, a method may include further, fewer, or different operations, performed in a similar or different order, than shown in FIG. 5. Examples of such operations, and various ways in which operations may be performed, will be apparent from the foregoing description of FIGS. 2 to 4.

Figure 6:
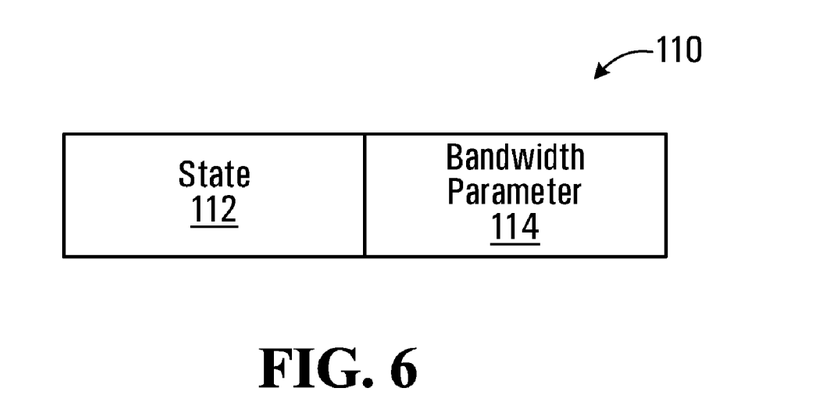
FIG. 6 is a block diagram of an example bandwidth reservation management data structure.

FIG. 6 is a block diagram of an example bandwidth reservation management data structure. Such a data structure may be stored in the system/usage database 38 of FIG. 2, for instance, to define reduced usage states and corresponding actions.

The data structure 110 includes an indication 112 of a state of reduced usage of a reserved amount of bandwidth in a communication system. This indication might include information relating to a mode of communications and a time parameter, for example.

A bandwidth parameter is also provided at 114. The bandwidth parameter is indicative of a target amount of bandwidth in accordance with which a reserved amount of bandwidth is to be adjusted when actual usage of the reserved amount of bandwidth reflects the reduced usage state specified at 112.

The data structure 110 represents a simple example of a format in which reduced usage states and corresponding bandwidth adjustments might be specified. In other embodiments, a data structure may include further, fewer, or different data fields in a similar or different order than shown. Each parameter shown in FIG. 4, for example, could be stored in a respective data field in one or more data structures, for example.

Embodiments of the present invention may be used to provide a mechanism for network operators to reclaim reserved but unused bandwidth. Network operators that offer VoD services might reclaim a portion of reserved bandwidth from paused video sessions and apply reclaimed bandwidth to new video purchase requests, for instance.

This type of functionality might be particularly useful in IP networks that deliver innovative new services such as triple play, but is more generally applicable to any services such as session-based services that employ reserved bandwidth to guarantee quality of service. Services for which there are known periods of time where the actual amount of bandwidth used is less than the full guaranteed amount are excellent candidates for the application of the techniques disclosed herein.

Network operators may thereby optimize bandwidth usage in their networks. This could allow a network operator to support more sessions, and thus increase revenues and potentially delay network capacity upgrades. As described above, a bandwidth reclaiming algorithm may be configurable or customizable to meet the specific needs of a variety of particular networks and services.

What has been described is merely illustrative of the application of principles of embodiments of the invention. Other arrangements and methods can be implemented by those skilled in the art without departing from the scope of the present invention.

For example, other parameters than those shown in the drawings and specifically described above may be used to define reduced usage states. Reduced usage states having a usage component and a time component have been shown in FIGS. 3 and 4. Reduced usage states and/or the bandwidth adjustments to be made in those states might also be adaptive, such that bandwidth is reclaimed more aggressively during certain times of day or when total network usage is above a certain level, for instance. Settings could also or instead be configured to control times of day or network usage levels at which bandwidth reclaim becomes active and inactive.

In addition, although described primarily in the context of methods and systems, other implementations of the invention are also contemplated, as instructions stored on a machine-readable medium for example.

We claim:

1. An apparatus comprising:
   a usage monitor configured to determine whether a communication session, for which an amount of bandwidth has been reserved in a communication system, has been suspended by a user; and
   a reservation manager operatively coupled to the usage monitor and configured to determine whether the reserved amount of bandwidth is to be adjusted where the communication session has been suspended by the user, and to adjust the reserved amount of bandwidth where the reserved amount of bandwidth is to be adjusted,
   wherein the usage monitor is configured to determine whether suspension of the communication session reflects any state of a plurality of reduced usage states, and wherein the reservation manager is configured to determine whether the reserved amount of bandwidth is to be adjusted based on respective parameters that are associated with the plurality of reduced usage states and are indicative of target amounts of bandwidth in accordance with which the reserved amount of bandwidth is to be adjusted for the plurality of reduced usage states.

2. The apparatus of claim 1, further comprising:
   an interface operatively coupled to the usage monitor, the usage monitor being configured to receive through the interface an indication of a mode of communications for which the reserved amount of bandwidth was reserved, and to determine whether the communication session has been suspended based on the indication.

3. The apparatus of claim 1, wherein the respective target amounts of bandwidth comprise different target amounts of bandwidth associated with different states of the plurality of reduced usage states.

4. The apparatus of claim 1, further comprising:
   a user interface operatively coupled to at least one of the usage monitor and the reservation manager, the user interface enabling configuration of the plurality of reduced usage states, configuration of the respective parameters, or configuration of both the plurality of reduced usage states and the respective parameters.

5. The apparatus of claim 4, wherein the user interface is configured to present to a user a Graphical User Interface (GUI).

6. The apparatus of claim 1, wherein the plurality of reduced usage states comprises a time-based series of reduced usage states.

7. The apparatus of claim 1, wherein the reserved amount of bandwidth comprises an amount of bandwidth reserved for the communication session between end user equipment and a server system.

8. The apparatus of claim 1, wherein the reservation manager is further configured to enable amounts of bandwidth to be reserved.

9. The apparatus of claim 8, wherein the usage monitor is further configured to determine whether actual usage of an adjusted amount of reserved bandwidth for the communication session is to return to a normal usage state, and wherein the reservation manager is further configured to determine whether additional bandwidth is available in the communication system, and to increase the adjusted amount of reserved bandwidth for the communication session where actual usage of the adjusted amount of reserved bandwidth is to return to the normal usage state and additional bandwidth is available.

10. A network element operable to enable communications in a communication network, the network element comprising:
    the apparatus of claim 1.

11. A communication network admission control system configured to control admission of communication sessions into a communication network, the admission control system comprising:
    the apparatus of claim 1.

12. A method comprising:
    determining whether a communication session, for which an amount of bandwidth has been reserved in a communication system, has been suspended by a user;
    determining whether the reserved amount of bandwidth is to be adjusted where the communication session has been suspended by the user; and
    adjusting the reserved amount of bandwidth where the reserved amount of bandwidth is to be adjusted,
    wherein determining whether the communication session has been suspended comprises determining whether suspension of the communication session reflects any state of a plurality of reduced usage states, and wherein determining whether the reserved amount of bandwidth is to be adjusted comprises determining respective parameters that are associated with the plurality of reduced usage states and are indicative of target amounts of bandwidth in accordance with which the reserved amount of bandwidth is to be adjusted for the plurality of reduced usage states.

13. The method of claim 12, wherein determining whether the communication session has been suspended comprises:
    receiving an indication of a mode of communications for which the reserved amount of bandwidth was reserved; and
    determining whether the communication session has been suspended based on the indication.

14. The method of claim 12, wherein the plurality of reduced usage states comprises a time-based series of reduced usage states.

15. The method of claim 12, wherein the reserved amount of bandwidth comprises an amount of bandwidth reserved for the communication session between end user equipment and a server system.

16. The method of claim 12, further comprising:
    determining whether actual usage of an adjusted amount of reserved bandwidth for the communication session is to return to a normal usage state;
    determining whether additional bandwidth is available in the communication system where actual usage of the adjusted amount of reserved bandwidth is to return to the normal usage state; and
    increasing the adjusted amount of reserved bandwidth for the communication session where additional bandwidth is available.

17. A non-transitory machine-readable medium storing instructions which when executed perform the method of claim 12.

* * * * *